US009401935B2

(12) United States Patent
Bakker et al.

(10) Patent No.: US 9,401,935 B2
(45) Date of Patent: Jul. 26, 2016

(54) SYSTEM AND METHOD FOR DETERMINING TRUST FOR SIP MESSAGES

(75) Inventors: Jan Hendrik Lucas Bakker, Keller, TX (US); Adrian Buckley, Tracy, CA (US); Andrew Allen, Hallandale Beach, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 145 days.

(21) Appl. No.: 12/915,649

(22) Filed: Oct. 29, 2010

(65) Prior Publication Data

US 2011/0047277 A1 Feb. 24, 2011

Related U.S. Application Data

(63) Continuation of application No. 12/727,743, filed on Mar. 19, 2010, now Pat. No. 8,407,354.

(60) Provisional application No. 61/168,798, filed on Apr. 13, 2009.

(51) Int. Cl.
*H04L 29/14* (2006.01)
*H04L 29/06* (2006.01)
*H04L 29/08* (2006.01)

(52) U.S. Cl.
CPC .......... *H04L 65/1073* (2013.01); *H04L 63/126* (2013.01); *H04L 65/1006* (2013.01); *H04L 69/40* (2013.01); *H04L 29/06027* (2013.01); *H04L 67/1095* (2013.01)

(58) Field of Classification Search
CPC .............. H04L 63/083; H04L 63/306; H04M 3/42068; H04M 7/1275; H04N 21/4532; G06F 21/316

USPC .................. 709/203, 206, 207, 223, 224, 227
See application file for complete search history.

(56) References Cited

U.S. PATENT DOCUMENTS

| 5,809,230 A | * | 9/1998 | Pereira ................. G06F 21/6218 |
| | | | 726/35 |
| 7,243,370 B2 | * | 7/2007 | Bobde ............... H04L 29/06027 |
| | | | 726/10 |
| 7,668,159 B2 | | 2/2010 | Buckley et al. |
| 7,668,183 B2 | | 2/2010 | Calme et al. |

(Continued)

FOREIGN PATENT DOCUMENTS

| CN | 1905472 A | 1/2007 |
| JP | 2007082073 A | 3/2007 |

(Continued)

OTHER PUBLICATIONS

International Search Report and Written Opinion; International Application No. PCT/US10/27973; International Filing Date: Mar. 19, 2010; Date of mailing: May 11, 2010; 9 pages.

(Continued)

*Primary Examiner* — Barbara Burgess
(74) *Attorney, Agent, or Firm* — Conley Rose, P.C.; J. Robert Brown, Jr.

(57) ABSTRACT

A method for performing initial registration is provided. The method includes receiving a server timeout message, the server timeout message including at least a field set to a value equal to a value received during a first registration. The method further includes initiating restoration procedures by performing an initial registration.

18 Claims, 5 Drawing Sheets

(56) References Cited

U.S. PATENT DOCUMENTS

| | | |
|---|---|---|
| 2005/0068935 A1 | 3/2005 | Bajko et al. |
| 2005/0190772 A1 | 9/2005 | Tsai et al. |
| 2005/0249219 A1 | 11/2005 | Bajko et al. |
| 2006/0165068 A1 | 7/2006 | Dalton, Jr. et al. |
| 2007/0234071 A1 | 10/2007 | Pyeon |
| 2008/0026778 A1 | 1/2008 | Cai et al. |
| 2008/0032691 A1 | 2/2008 | Kyzivat |
| 2008/0039085 A1 | 2/2008 | Phan-Anh |
| 2008/0104696 A1 | 5/2008 | Ll et al. |
| 2008/0127320 A1 | 5/2008 | De Lutiis et al. |
| 2008/0166989 A1 | 7/2008 | Sokondar |
| 2008/0168540 A1 | 7/2008 | Agarwal et al. |
| 2008/0182575 A1 | 7/2008 | Torres et al. |
| 2008/0205600 A1* | 8/2008 | Sparks .............. H04M 7/0084 379/45 |
| 2008/0288458 A1* | 11/2008 | Sun et al. ........................ 707/3 |
| 2009/0002333 A1* | 1/2009 | Maxwell ............ G06F 3/04883 345/173 |
| 2009/0077616 A1 | 3/2009 | Lindholm et al. |
| 2009/0093237 A1 | 4/2009 | Levenshteyn et al. |
| 2009/0097398 A1 | 4/2009 | Belinchon Vergara et al. |
| 2009/0103518 A1 | 4/2009 | Yu et al. |
| 2009/0191869 A1* | 7/2009 | Siegel .................... H04W 8/02 455/435.1 |
| 2009/0191870 A1 | 7/2009 | Siegel et al. |
| 2009/0210743 A1 | 8/2009 | Gu et al. |
| 2009/0245265 A1* | 10/2009 | Takeshima ............ H04L 69/40 370/401 |
| 2009/0262724 A1* | 10/2009 | Suzuki ............... H04L 67/1095 370/352 |
| 2009/0282236 A1 | 11/2009 | Hallenstal et al. |
| 2009/0298458 A1 | 12/2009 | Bakker et al. |
| 2010/0062767 A1 | 3/2010 | Leis et al. |
| 2010/0070758 A1 | 3/2010 | Low et al. |
| 2010/0074100 A1* | 3/2010 | Suzuki ............... G06F 11/2025 370/221 |
| 2010/0082972 A1 | 4/2010 | Benco et al. |
| 2011/0072144 A1 | 3/2011 | Fikouras et al. |
| 2011/0093933 A1 | 4/2011 | Lindholm et al. |
| 2011/0131627 A1 | 6/2011 | Abendroth et al. |
| 2011/0179181 A1 | 7/2011 | Elz |
| 2011/0202986 A1 | 8/2011 | Horn et al. |
| 2011/0299442 A1 | 12/2011 | Nammi et al. |
| 2011/0299462 A1 | 12/2011 | Imbimbo et al. |
| 2012/0265849 A1 | 10/2012 | Bakker et al. |
| 2012/0331058 A1 | 12/2012 | Huston et al. |
| 2013/0010783 A1 | 1/2013 | Androski et al. |

FOREIGN PATENT DOCUMENTS

| | | |
|---|---|---|
| JP | 2007510328 A | 4/2007 |
| WO | 2008049455 A1 | 5/2008 |
| WO | 2009086939 A1 | 7/2009 |

OTHER PUBLICATIONS

3rd Generation Partnership Project; Technical Specification Group Core Network and Terminals; IP multimedia call control protocol based on Session Initiation Protocol (SIP) and Session Description Protocol (SDP); Stage 3 (Release 8); Mar. 2009; pp. 1-23, 81, 110, 164-171, & 215; Valbonne ,France.
Change Request CP-090223; 3FPP TSG CT Plenary Meeting #43; Fiarritz, France, Mar. 4-6, 2009.
3GPP TS 24.229v8.6.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 8; Dec. 2008; 600 pgs.
Ericsson; 3GPP TSG CT Plenary Meeting #43; Title: Returning an Error to Trigger a New Registration when IMS Restoration is Supported; Change Request; CP-090223; Biarritz, France, Mar. 4-6, 2009; 13 pgs.
M. T. Hunter et al.; "Security Issues with the IP Multimedia Subsystem (IMS);" MNCNA '07; Nov. 26, 2007.
IP Multimedia SubSystem (IMS). SIP in 3GPP [online]; [retrieved Mar. 16, 2010]; retrieved from the Internet http://www.iptel.org/~dor/papers/MM_SIP_ngn.ppt.
Leapstone Systems Inc.; "Implementation Agreement for ISC Interface MSF-IA-SIP .013-Final;" Multiservice Forum; Nov. 1, 2009; p. 1-37.
Korean Office Action and Translation; KR Patent Application No. 10-2011-7027107; Date of Mailing: May 20, 2013; pp. 1-7.
ETSI TS 124 229 V8.7.0, Technical Specification, Digital Cellular Telecommunications system (Phase 2+); Universal Mobile Telecommunications System (UMTS); LTE; Internet Protocol (IP) multimedia call control protocol based on Session Initiation Protocol (SIP); Stage 3-3GPP TS 24.229 version 8.7.0 Release 8; Mar. 2009; Sections 5.12A1.6, 5.1.1.2, and 5.1.3.1, pp. 1-622.
U.S. Appl. No. 13/544,760; Non-Final Office Action; Date Filed: Jul. 9, 2012; Date Mailed: Feb. 28, 2013; pp. 1-12.
3GPP TS 24.229v7.0.0 (Jun. 2005) 3rd Generation Partnership Project; Technical Specification Group Core Network and Terminals; IP Multimedia Call Control Protocol Based on Session Initiation Protocol (SIP) and Session Description Protocol (SDP); Stage 3; Release 7; Jun. 2005, pp. 23-47, and 69-72.
Change Request CP-090223; 3FPP TSG CT Plenary Meeting #43; Fiarritz, France, Mar. 4-6, 2009, pp. 1-13.
Chinese Office Action and Translation; Application No. 201080026092.0, Date of Mailing Dec. 5, 2013; pp. 1-24.
3GPP TS 24.229v8.7.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 8; Mar. 2009; pp. 55-58 and 81, [retrieved on Feb. 28, 2013], internet <URL, http://www.3gpp.org/ftp/Specs/archive/24_series/24.229/24229-870.zip>.
Japanese Office Action and Translation; JP Patent Application No. 2012-504691; Date of Mailing: Mar. 6, 2013; pp. 1-5.
C. Jennings, "Private Extensions to the Sessioin Initiation Protocol (SIP) for Asserted Identity within Trusted Networks," Network Working Group, Internet Society, Nov. 2002, RFC 3325, pp. 1-17.
Chinese Office Action and Translation; Application No. 201080026092.0; Date of Mailing Jun. 12, 2014; pp. 1-23.
3GPP TS 24.229v8.7.0, Release 8, ETSI TS 124, Digital Cellular Telecommunications System (Phase 2+); Universal Mobile Telecommunications Systems (UMTS); LTE; Internet Protocol (IP) Multimedia Call Control Protocol Based on Session Initiation Protocol (SIP) and Session Description Protocol (SDP); Stage 3; Release Mar. 31, 2009; pp. 1-172.
European Examination Report; Application No. 10764806.5; Nov. 4, 2014; 4 pages.
Bakker, Jan Hendrik Lucas, et al.; U.S. Appl. No. 12/727,743, filed Mar. 19, 2010; Title: System and Method for Determining Trust for SIP Messages.
Bakker, Jan Hendrik Lucas; U.S. Appl. No. 12/771,190, filed Apr. 30, 2010; Title: System and Method for Determining Trust for SIP Messages.
Bakker, Jan Hendrik Lucas, et al.; U.S. Appl. No. 13/544,760, filed Jul. 9, 2012; Title: System and Method for Determining Trust for SIP Messages.
Bakker, Jan Hendrik Lucas, et al.; U.S. Appl. No. 13/545,041, filed Jul. 10, 2012; Title: System and Method for Determining Trust for SIP Messages.
3GPP TS 24.229 V8.9.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 8; Sep. 2009; 628 pages.
Willis, D., et al.; "Session Initiation Protocol (SIP) Extension Header Field for Registering Non-Adjacent Contacts"; RFC 3327; Dec. 2002; 34 pages.
Rosenberg, J., et al.; "SIP: Session Initiation Protocol"; RFC 3261; Jun. 2002; 269 pages.
3GPP TSG CT WG1 Meeting #59; "Correcting Preventing of DDOS Attack on Register"; C1-092484; Los Angeles, USA; Jun. 22-26, 2009; 10 pages.

(56) References Cited

OTHER PUBLICATIONS

Notice of Allowance dated Aug. 3, 2012; U.S. Appl. No. 12/727,743, filed Mar. 19, 2010; 18 pages.
Notice of Allowance dated Nov. 26, 2012; U.S. Appl. No. 12/727,743, filed Mar. 19, 2010; 8 pages.
Office Action dated Jul. 21, 2010; U.S. Appl. No. 12/771,190, filed Apr. 30, 2010; 12 pages.
Notice of Allowance dated Sep. 21, 2010; U.S. Appl. No. 12/771,190, filed Apr. 30, 2010; 5 pages.
Office Action dated Jun. 7, 2013; U.S. Appl. No. 13/544,760, filed Jul. 9, 2012; 9 pages.
Office Action dated Aug. 13, 2013; U.S. Appl. No. 13/544,760, filed Jul. 9, 2012; 4 pages.
Notice of Allowance dated Nov. 14, 2013; U.S. Appl. No. 13/544,760, filed Jul. 9, 2012; 9 pages.
Office Action dated Jan. 22, 2013; U.S. Appl. No. 13/545,041, filed Jul. 10, 2012; 12 pages.
Office Action dated Jun. 7, 2013; U.S. Appl. No. 13/545,041, filed Jul. 10, 2012; 9 pages.
Office Action dated Aug. 13, 2013; U.S. Appl. No. 13/545,041, filed Jul. 10, 2012; 4 pages.
Notice of Allowance dated Nov. 12, 2013; U.S. Appl. No. 13/545,041, filed Jul. 10, 2012; 9 pages.
Canadian Office Action; Application No. 2,758,486; Aug. 1, 2013; 2 pages.
Canadian Office Action; Application No. 2,758,486; Sep. 30, 2014; 2 pages.
European Extended Search Report; Application No. 10764806.5; Jan. 7, 2014; 5 pages.
Canadian Office Action; Application No. 2,758,486; Oct. 30, 2015; 3 pages.
European Examination Report; Application No. 10764806.5; Dec. 15, 2015; 4 pages.
European Examination Report; Application No. 10764806.5; May 26, 2015; 4 pages.

* cited by examiner

SYSTEM AND METHOD FOR DETERMINING TRUST FOR SIP MESSAGES

CROSS REFERENCE TO RELATED APPLICATIONS

The present application is a continuation of U.S. application Ser. No. 12/727,743, filed Mar. 19, 2010, which in turn claims priority to U.S. Provisional Application Ser. No. 61/168,798, filed Apr. 13, 2009, the contents of which are incorporated herein by reference in their entirety.

BACKGROUND

The IP (Internet Protocol) Multimedia Subsystem (IMS) is a standardized architecture for providing multimedia services and voice-over-IP calls to both mobile and fixed user agents (UAs). The Session Initiation Protocol (SIP) been standardized and governed primarily by the Internet Engineering Task Force (IETF) as a signaling protocol for creating, modifying, and terminating IMS-based calls or sessions.

As used herein, the terms "user agent" and "UA" might in some cases refer to mobile devices such as mobile telephones, personal digital assistants, handheld or laptop computers, and similar devices that have telecommunications capabilities. Such a UA might be part of a UE (User Equipment). A UE may have multiple UAs. A UE may have removable memory module associated, such as but not limited to a Universal Integrated Circuit Card (UICC) that includes a Subscriber Identity Module (SIM) application, a Universal Subscriber Identity Module (USIM) application, a IP Multimedia Services Identity Module (ISIM) application, or a Removable User Identity Module (R-UIM) application, etc. Examples of such modules could include, but are not limited to, PC Card, CompactFlash I, CompactFlash II, SmartMedia, Memory Stick, Memory Stick Duo, Memory Stick PRO Duo, Memory Stick PRO-HG Duo, Memory Stick Micro M2, Multimedia Card, Reduced Size Multimedia Card, MMCmicro Card, Secure Digital card, SxS, Universal Flash Storage, miniSD card, microSD card, xD-Picture Card, Intelligent Stick, Serial Flash Module, µ card, and NT Card. When the information is stored on a removable memory module, the contents of the module may be imaged into the UE.

Alternatively, such a UA might consist of the device itself without such a module. In other cases, the term "UA" might refer to devices that have similar capabilities but that are not transportable, such as fixed line telephones, desktop computers, set-top boxes, or network nodes. When one or more UAs are part of a network node, the network node could act on behalf of another function such as a UA or a fixed line device and simulate or emulate the UA or fixed line device. For example, for some UAs, the IMS SIP client that would typically reside on the device actually resides in the network and relays SIP message information to the device using optimized protocols. In other words, some functions that were traditionally carried out by a UA can be distributed in the form of a remote UA, where the remote UA represents the UA in the network. The term "UA" can also refer to any hardware or software component that can terminate a communication session that could include, but is not limited to, a SIP session. Also, the terms "user agent", "UA", "user equipment", "UE", and "node" might be used synonymously herein. Also, the terms "header" and "header field" might be used synonymously herein. Also, a SIP message is SIP request or a SIP response.

A UA might connect to a SIP-based network that includes a plurality of other components such as a P-CSCF (Proxy Call Session Control Function), an S-CSCF (Serving CSCF), an IBCF (Interconnect Border Control Function), an Application Server (AS), and other components, any of which could be referred to as network nodes. A trust relationship might exist between nodes in a SIP network. That is, a group of nodes within a network might regard all messages received from other nodes in the group as legitimate. Such a group can be said to form a trust domain or one or more trusted networks. IETF RFC 3325 titled "Private Extensions to the Session Initiation Protocol (SIP) for Asserted Identity within Trusted Networks" discusses this subject further.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
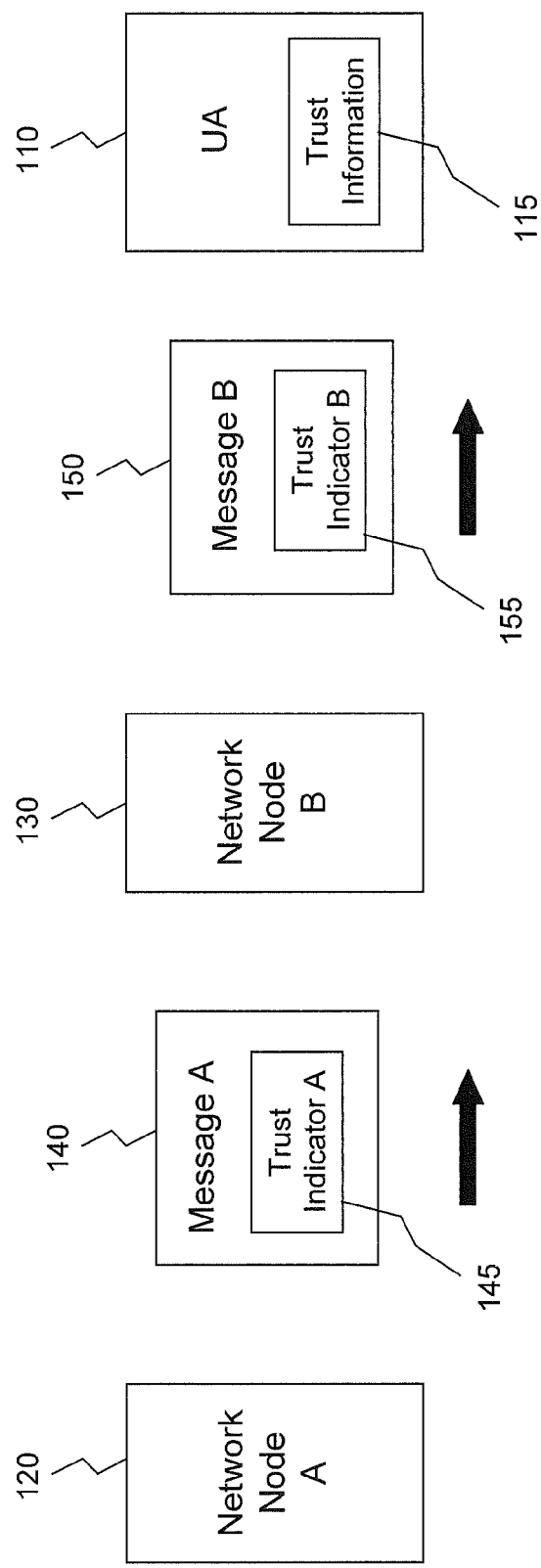
FIG. 1 is a diagram of a communications system including a plurality of network nodes according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A node within a trust domain in an IMS network might receive a message from a node outside the trust domain. In some cases, such a message might direct the node in the trust domain to perform one or more actions that may not be desirable for that node to perform. For example, a message may maliciously be sent to a plurality of UAs falsely informing the UAs that a server timeout has occurred. A UA receiving such a message might attempt to re-register with a SIP registrar even though re-registration is not actually necessary. If a large number of the UAs attempt to re-register, the registrar might become overloaded and fail. This could lead to major problems in the network since other UAs might then be unable to register.

In an embodiment, a message sent to a network node from outside the network node's trust domain can include a trust indicator that indicates the trustworthiness of the message. A trust indicator can also be a trust token, trust identifier or trust flag. Trust indicators can be one of two types. The presence of one type of trust indicator in a message indicates that the network node that sent the message can be trusted. The recipient of a message containing such a trust indicator need not perform any verification of the trust indicator. When the other type of trust indicator is present in a message, the recipient of the message compares the trust indicator with internally stored trust information/database. If the trust indicator matches the stored trust information, the trust indicator is verified, and the recipient/receiver knows that the network node that sent the message can be trusted.

If the first type of trust indicator is present in a message or if the second type is present and is verified, the network node that receives the message performs the actions that are typically associated with receipt of the message or the message and its contents. If no trust indicator is present or if the trust indicator is not verified, the network node that receives the message might not perform one or more of the actions that are typically associated with receipt of the message or the message and its contents.

In an embodiment, the network node that receives the message is a UA that maintains trust information related to network nodes outside the UA's trust domain. Upon receiving a message from outside its trust domain, the UA can compare the trust indicator that might be included with the message with the trust information that the UA maintains. If the UA verifies that the trust indicator matches the trust information that it maintains, the UA performs the actions that are typically associated with receipt of the message or the message and its contents. If the UA cannot verify that the trust indicator matches the trust information that it maintains, the UA does not perform at least one action that is typically associated with receipt of the message or the message and its contents.

These embodiments are illustrated in FIG. 1, where a UA 110 is capable of communicating with a network node B 130, which is capable of communicating with a network node A 120. The UA 110, network node A 120, and network node B 130 might be components in an IMS-based network, and network node A 120 and network node B 130 might be outside the UA's trust domain. While only two other network nodes are shown, other numbers could be present. In this embodiment, network node A 120 generates a message A 140 and includes a trust indicator A 145 in the message A 140. Network node 120 then sends the message A 140 to network node B 130. Receipt of message A 140 causes network node B 130 to generate a message B 150 containing a trust indicator B 155, and message B 150 is then sent to the UA 110. Message A 140 may or may not be the same as message B 150, and trust indicator A 145 may or may not be the same as trust indicator B 155. In other words, network node B 130 might simply pass on the trust indicator A 145 that is received from network node A 120, or network node B 130 might generate a new trust indicator B 155 based on the trust indicator A 145 or other information received from the network node A 120 and/or other network nodes.

In other embodiments, network node A 120 does not include the trust indicator A 145 in the message A 140. Instead, network node B 130 generates the trust indicator B 155 without regard to any information included in message A 140, and network node B 130 then includes trust indicator B 155 in the message B 150 sent to the UA 110. In other words, the trust indicator that the UA 110 receives might have been generated by the network node with which the UA 110 is in direct communication, might have been generated by another network node and then passed on without modification by the network node which the UA 110 is in direct communication, or might have been generated by another network node and then passed on with modification by the network node which the UA 110 is in direct communication.

In some embodiments, upon receiving a message that contains a trust indicator, the UA 110 performs the actions that are typically associated with receipt of the message. In other embodiments, upon receiving a message that contains a trust indicator, the UA 110 compares the trust indicator to trust information 115 that the UA 110 has previously received and stored. When a match is found between the trust indicator in the message and the stored trust information 115, the UA 110 performs the actions that are typically associated with receipt of the message. When a match is not found between the trust indicator and the stored trust information 115, the UA 110 does not perform at least one action that is typically associated with receipt of the message.

In an embodiment, the trust indicator and/or the trust information 115 might be a Uniform Resource Identifier (URI), or some other type of identifier, of a trusted network node. A network node might include its URI in a message sent to the UA 110. The UA 110 might have previously received trust information 115 in the form of a list of trusted URIs. Upon receiving a message with a trust indicator in the form of a URI, the UA 110 might compare the URI in the message with the URIs in the list of URIs. If a match is found, the UA 110 might trust the network node that sent the message.

The UA 110 might not be capable of identifying whether a URI belongs to a P-CSCF, an S-SCSF, an IBCF, or some other type of network node. Some network nodes (such as an IBCF) may or may not include their URI information. Hence, the UA may not be sure which URI represents which network node. In order to determine this, some conventions might be followed or an additional indicator may be added. A SIP REGISTER request and its response (and the header field values included in the response or request) typically should not leave the trusted domain. A third party REGISTER request triggered by the original REGISTER request may leave the trusted domain. In an embodiment, measures are set up to prevent contamination of the information in the responses to the REGISTER in such a case. For example, the fact that a URI represents a known network node could be indicated by a URI parameter to a SIP message. For instance, for an S-CSCF, the URI parameter scscf could be added. Alternatively, a URI parameter such as "fe" could be set to a value or a list of values such as fe="scscf" or fe="pcscf,scscf". Here, a network node is referred to as a functional element, or "fe". When the SIP Service-Route header is used, the message might take a form such as the following:

Service-Route: sip:orig@scscf1.home1.com;lr;scscf or

Service-Route: sip:orig@pcscf1.home1.com;lr;fe="pcscf, scscf"

in deployments where the P-CSCF and S-CSCF (and possibly other) functional elements are collocated on one physical equipment.

As an alternative, after receiving trust information 115 in the form of a list of URIs, the UA 110 could query a database or other data repository to determine the network nodes and/or trust indicator and/or the trust information that correspond to the listed URIs. The database could be a network node in the network or a database on the device stored in memory that is either internal or in a removable memory module.

In another embodiment, the SIP Config Framework, the SIP Policy Framework, an EAP based policy retrieval mechanism, an XCAP/HTTP based server, or an Open Mobile Alliance (OMA) device management (DM) object could be used to convey trust indicators and/or the trust information and/or the network nodes that correspond to the listed URIs to the UA 110.

The UA 110 might receive the trust information 115 in one or more of several different ways. In some embodiments, the trust information 115 might be provided to the UA 110 in response to a SIP REGISTER request submitted by the UA 110. In some variations of these embodiments, the response might be a SIP 200 OK response, and the trust information 115 might be included directly in the 200 OK response. The trust information 115 could be included in the 200 OK response by a network node, such as an application server, that received the REGISTER request because the request was routed through it. Alternatively, the application server might have received a third party registration request as configured by initial Filter Criteria on an S-CSCF.

Figure 2:
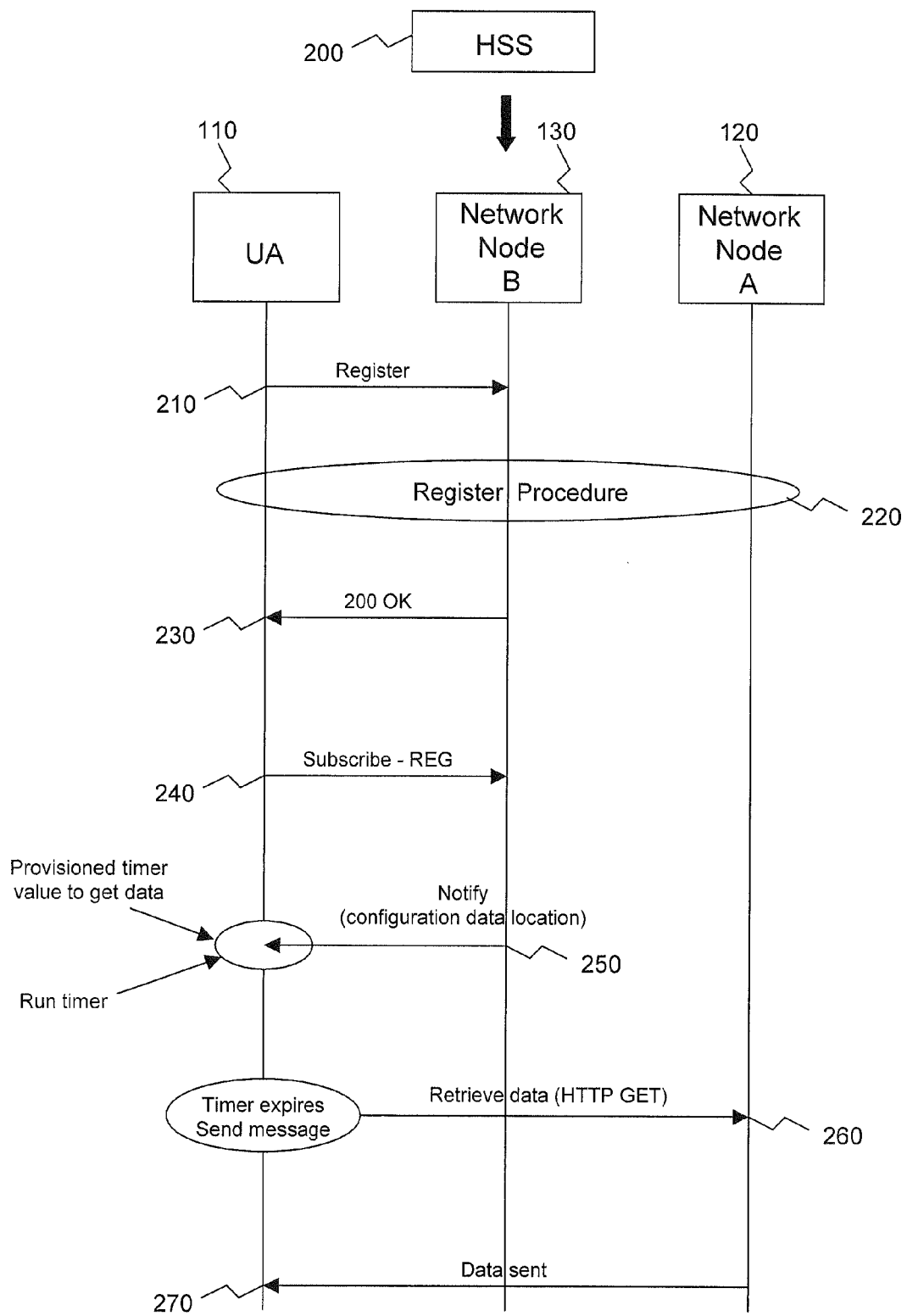
FIG. 2 is a call flow diagram illustrating a method for a UA to retrieve trust information according to an embodiment of the disclosure.

In other variations of these embodiments, the 200 OK response that the UA 110 receives in response to a REGISTER request might contain information that informs the UA 110 how the trust information 115 can be obtained. Such an embodiment is illustrated in FIG. 2. At event 210, the UA 110 registers with an IMS network by sending a REGISTER request to network node B 130, which might be an S-CSCF. As part of the registration procedure 220, a home subscriber server (HSS) 200, or a similar component, might download to network node B 130 the trust information 115 that is to be used by the UA 110. At event 230, the registration is complete, and network node B 130 sends the UA 110 a 200 OK response. In the embodiment of FIG. 2, the 200 OK response might contain a URI, or some other type of identifier, that identifies a location where the trust information 115 can be obtained. In other embodiments, as mentioned above, the 200 OK response might directly include the trust information 115.

Alternatively, as shown at event 240, as part of the SIP registration, the UA 110 might subscribe to the SIP Reg Event package, which can deliver information back to the UA 110. In response to the Subscribe message at event 240, network node B 130, at event 250, might return a message such as a Notify message. The Notify message might contain the location of the trust information 115 that was downloaded from the HSS 200 as described above.

When the UA 110 has received the location of the trust information 115, either via the 200 OK message at event 230, via the Notify message at event 250, or via another SIP method, the UA 110 can retrieve the trust information 115 from the specified location. In this case, the specified location is network node A 120, but in other cases, the trust information 115 could be retrieved from other network nodes. At event 260, the UA 110 sends a message, such as an HTTP GET message, to retrieve the trust information 115 from network node A 120. At event 270, network node A 120 sends the trust information 115 to the UA 110. The UA 110 can then store the trust information 115 in internal or removable memory, where the trust information 115 will be available for future use by the UA 110 in determining whether a network node is trusted.

In an alternative embodiment, the trust information 115 might be provided during the registration of the UA 110 in one or more fields in the SIP Path header or the SIP Service-Route header. For example, a SIP REGISTER request originated by the UA 110 might be routed through at least a P-CSCF and an S-CSCF, where the S-CSCF performs the role of REGISTRAR. The response (such as a 200 OK response) that the UA 110 receives to its REGISTER request might include an indicator (such as a new P-header, an existing header, or embedded XML) conveying information about the network nodes (such as a P-CSCF and an S-CSCF) on the path the REGISTER request was routed over. In addition, one or more fields in the SIP Service-Route header might contain at least the addresses of the P-CSCF or S-CSCF that actually perform any services. The address of the S-CSCF on the Service-Route header field and the S-CSCF on the Path header field are not necessarily the same.

In some cases, an S-CSCF acting as a REGISTRAR may not be the S-CSCF that replies to other requests from the UA 110. More generally, not all network nodes that are capable of transmitting a trusted message may be included on the path over which the REGISTER request or its response is routed. However, if a network node transmits a trusted message, it may be advantageous to populate a header field (such as a SIP P-Asserted-Identity header field) or a URI parameter or a SIP body part with a value representative of the originator. Several means exist to enable the UA 110 to determine that some value representative of the originator could only be known or only be inserted by the originator. For example, a value in the P-Asserted-Identity header field could be compared against a value on the Service-Route header field.

When a trust indicator is not present in a message received by the UA 110 from a network node outside the UA's trust domain, or when a trust indicator is present but does not match the UA's stored trust information 115, the UA 110 could react in several different ways. In some cases the UA 110 might deny, discard, or terminate the message. In other cases, the UA 110 might return an error message to the network node that sent the message. In still other cases, the UA 110 might remove portions of the message that might cause undesirable actions to be taken and might process the remainder of the message. In some cases, various combinations of these actions could be taken.

Figure 3:
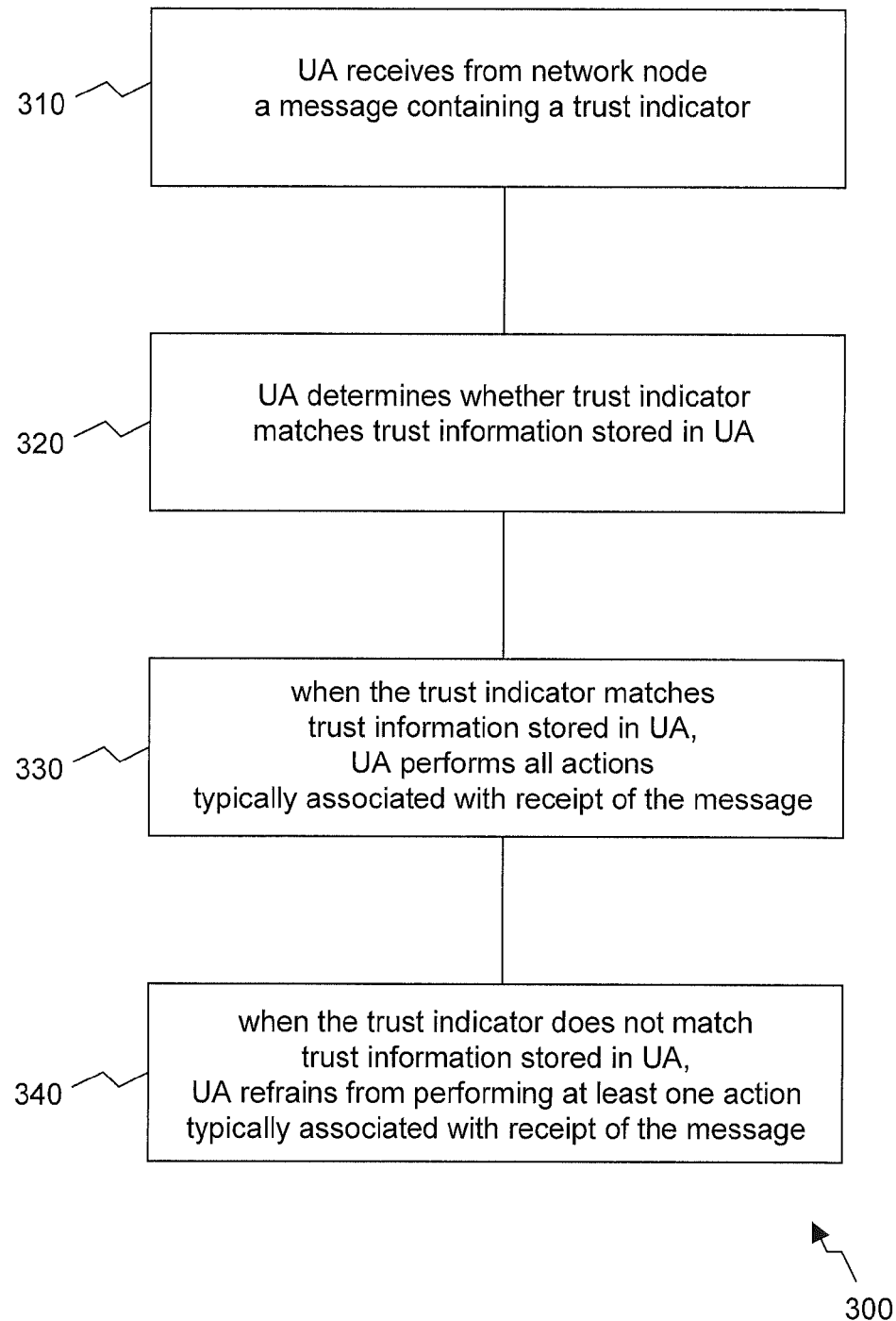
FIG. 3 illustrates a method for determining if a node outside a trust domain in an IMS network can be trusted according to an embodiment of the disclosure.

FIG. 3 illustrates an embodiment of a method 300 for determining if a node outside a trust domain in an IMS network can be trusted. At block 310, a UA receives from the network node a message containing a trust indicator. At block 320, the UA determines whether the trust indicator matches trust information stored in the UA. At block 330, when the trust indicator matches trust information stored in the UA, the UA performs all actions typically associated with receipt of the message. At block 340, when the trust indicator does not match trust information stored in UA, the UA refrains from performing at least one action typically associated with receipt of the message.

Figure 4:
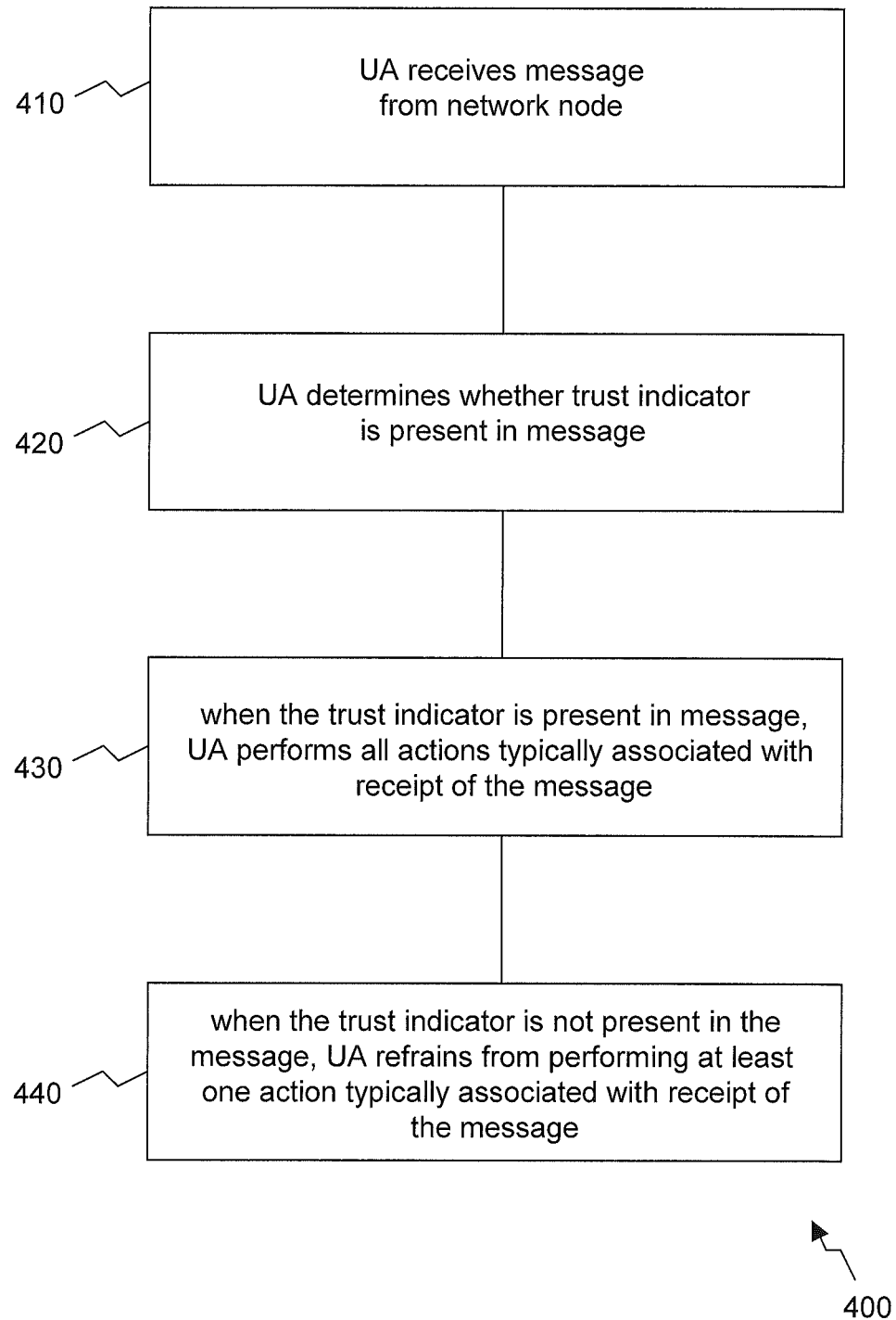
FIG. 4 illustrates a method for determining if a node outside a trust domain in an IMS network can be trusted according to an alternative embodiment of the disclosure.

FIG. 4 illustrates an alternative embodiment of a method 400 for determining if a node outside a trust domain in an IMS network can be trusted. At block 410, a UA receives a message from the network node. At block 420, the UA determines whether a trust indicator is present in message. At block 430, when the trust indicator is present in the message, the UA performs all actions typically associated with receipt of the message. At block 440, when the trust indicator is not present in the message, the UA refrains from performing at least one action typically associated with receipt of the message.

Returning to the example mentioned above where a message is maliciously sent to a plurality of UAs falsely informing the UAs that a server timeout has occurred, the embodiments described herein might prevent the UAs from unnecessarily attempting to re-register with the network. When one of the UAs receives the malicious message, the UA might use a technique described herein to determine whether the sender of the message can be trusted. Since, in this case, the sender would not be trusted, the UA would not perform one or more actions typically associated with receipt of the message. In this case, the UA would not re-register.

One possible reflection for the UE could be as follows in 3GPP TS 24.229, subclause 5.1.2A.1.6, titled "Abnormal cases":

In the event the UE receives a 504 (Server Time-out) response containing:
- a P-Asserted-Identity header field set to:
    - a value equal to a value on the Service-Route or Path header field received during registration; or
- a Content-Type header field set according to subclause 7.6 (i.e. "application/3gpp-ims+xml"), independent of the value or presence of the Content-Disposition header field, independent of the value or presence of Content-Disposition parameters, then the default content disposition, identified as "3gpp-alternative-service", is applied as follows:
    - if the 504 (Server Time-out) response includes an IM CN subsystem XML body as described in subclause 7.6 with the type element set to "restoration" and the action element set to "initial-registration", then the UE:
        - shall initiate restoration procedures by performing an initial registration as specified in subclause 5.1.1.2; and
        - may provide an indication to the user based on the text string contained in the reason element.

One possible reflection for the P-CSCF could be as follows in 3GPP TS 24.229, subclause 5.2.6.3.2A, titled "Abnormal cases":

When the P-CSCF is unable to forward an initial request for a dialog or a request for a standalone transaction to the next hop in the Service-Route header, as determined by one of the following:
- there is no response to the service request and its retransmissions by the P-CSCF;
- a 3xx response or 480 (Temporarily Unavailable) response is received for the request; or
- by unspecified means available to the P-CSCF;

and:
- the P-CSCF supports restoration procedures;

then the P-CSCF:
1) shall reject the request by returning a 504 (Server Time-out) response to the UE;
2) shall assume that the UE supports version 1 of the XML Schema for the 3GPP IM CN subsystem XML body if support for the 3GPP IM CN subsystem XML body as described in subclause 7.6 in the Accept header field is not indicated; and
3) shall include in the 504 (Server Time-out) response:
   a) a Content-Type header field with the value set to associated MIME type of the 3GPP IM CN subsystem XML body as described in subclause 7.6.1;
   b) a P-Asserted-Identity header field set to the value of the SIP URI of the P-CSCF included in the Path header field during the registration of the user whose UE sent the request causing this response; and
   c) a 3GPP IM CN subsystem XML body containing:
      i) an <alternative-service> element, set to the parameters of the alternative service;
      ii) a <type> child element, set to "restoration" to indicate that restoration procedures are supported;
      iii) a <reason> child element, set to an operator configurable reason; and
      iv) an <action> child element, set to "initial-registration"

NOTE: These procedures do not prevent the usage of unspecified reliability or recovery techniques above and beyond those specified in this subclause.

One possible reflection for the S-CSCF could be as follows in 3GPP TS 24.229, subclause 5.4.3.2, titled "Requests initiated by the served user":

When the S-CSCF receives a request initiated by the served user for which the S-CSCF does not have the user profile or does not trust the data that it has (e.g. due to restart), the S-CSCF shall attempt to retrieve the user profile from the HSS. If the S-CSCF fails to retrieve the user profile and the S-CSCF supports restoration procedures, then the S-CSCF shall:
1) reject the request by returning a 504 (Server Time-out) response to the UE;
2) assume that the UE supports version 1 of the XML Schema for the 3GPP IM CN subsystem XML body if support for the 3GPP IM CN subsystem XML body as described in subclause 7.6 in the Accept header field is not indicated; and
3) a P-Asserted-Identity header field set to the value of the SIP URI of the S-CSCF included in the Service-Route header field during the registration of the user whose UE sent the request causing this response;
4) include in the 504 (Server Time-out) response:
   a) a Content-Type header field with the value set to associated MIME type of the 3GPP IM CN subsystem XML body as described in subclause 7.6.1; and
   b) a 3GPP IM CN subsystem XML body:
      i) an <alternative-service> element, set to the parameters of the alternative service;
      ii) a <type> child element, set to "restoration" to indicate that restoration procedures are supported;
      iii) a <reason> child element, set to an operator configurable reason; and
      iv) an <action> child element, set to "initial-registration"

In addition, the following modifications might be made to 3GPP TS 24.229, subclause 5.10.4.1, titled "General":

NOTE 1: THIG functionality is performed in I-CSCF in Release-5 and Release-6 and is compatible with the procedures specified in this subclause.

The following procedures shall only be applied if network topology hiding is required by the network. The network requiring network topology hiding is called the hiding network.

NOTE 2: Requests and responses are handled independently therefore no state information is needed for that purpose within an IBCF.

The IBCF shall apply network topology hiding to all header fields which reveal topology information, such as Via, Route, Record-Route, Service-Route, and Path.

Upon receiving an incoming REGISTER request for which network topology hiding has to be applied and which includes a Path header field, the IBCF shall add the routable SIP URI of the IBCF to the top of the Path header field. The IBCF may include in the inserted SIP URI an indicator that identifies the direction of subsequent requests received by the IBCF i.e., from the S-CSCF towards the P-CSCF, to identify the UE-terminating case. The IBCF may encode this indicator in different ways, such as, e.g., a unique parameter in the URI, a character string in the username part of the URI, or a dedicated port number in the URI.

NOTE 3: Any subsequent request that includes the direction indicator (in the Route header field) or arrives at the dedicated port number, indicates that the request was sent by the S-CSCF towards the P-CSCF.

Upon receiving an incoming initial request for which network topology hiding has to be applied a SIP request or SIP response with a P-Asserted-Identity header field set the SIP URI of a functional element within its trust domain, the IBCF shall apply network topology hiding to the P-Asserted-Identity header field.

Upon receiving an incoming initial request for which network topology hiding has to be applied and which includes a Record-Route header field, the IBCF shall add its own routable SIP URI to the top of the Record-Route header field.

The UE may receive a different value than the value stored by the network node as the IBCF may perform location hiding and replace the URIs in the SIP message (such as the Path or Service-Route header fields) with, for example, at least one of the values of the SIP URI of the IBCF. The IBCF would have to consistently perform this location hiding or replacing of URIs in order not to break the trust that is indicated.

When the SIP UA receives a SIP message, it will analyze a table within the function to see if any actions need to be performed for that SIP message, e.g., an INVITE request. The table or data structure identifies the indicators. These indicators could be, but are not limited to, SIP header fields, SIP specific values to look for, etc. For each field, there might also be an action or group of actions that could be performed but are not limited to:

| | |
|---|---|
| Remove | Remove the item if it is not trusted |
| Ignore | Ignore the item |
| Terminate | Terminate the dialogue or refuse the dialogue to continue |
| Trusted | Mark the field as trusted |
| Nontrust | Mark the field as non trusted |
| Trust mess | Mark Message as trusted |
| Trustnomess | Mark Message as not trusted |

For the latter two items, "Trust mess" and "Trustnomess", all items in the SIP method have to be trusted. The method for identifying the message as trusted could be conveyed as:
A) New Feature Tag Here a feature tag will be appended to the contact header with a value indicating the trustworthiness of the message.
B) New URI parameter
C) Body part (e.g., in XML)
D) New header field
An example embodiment of the data structure is below.

```
SIP Method
|
|> INVITE
|   |
|   |> Field 1 : Value X
|   |     |> Action: Remove, ignore, terminate dialogue etc
|   |> Field 2: Value k, c
|
|>200 OK
|   |
|   |>Field 3: Value.....
```

Figure 5:
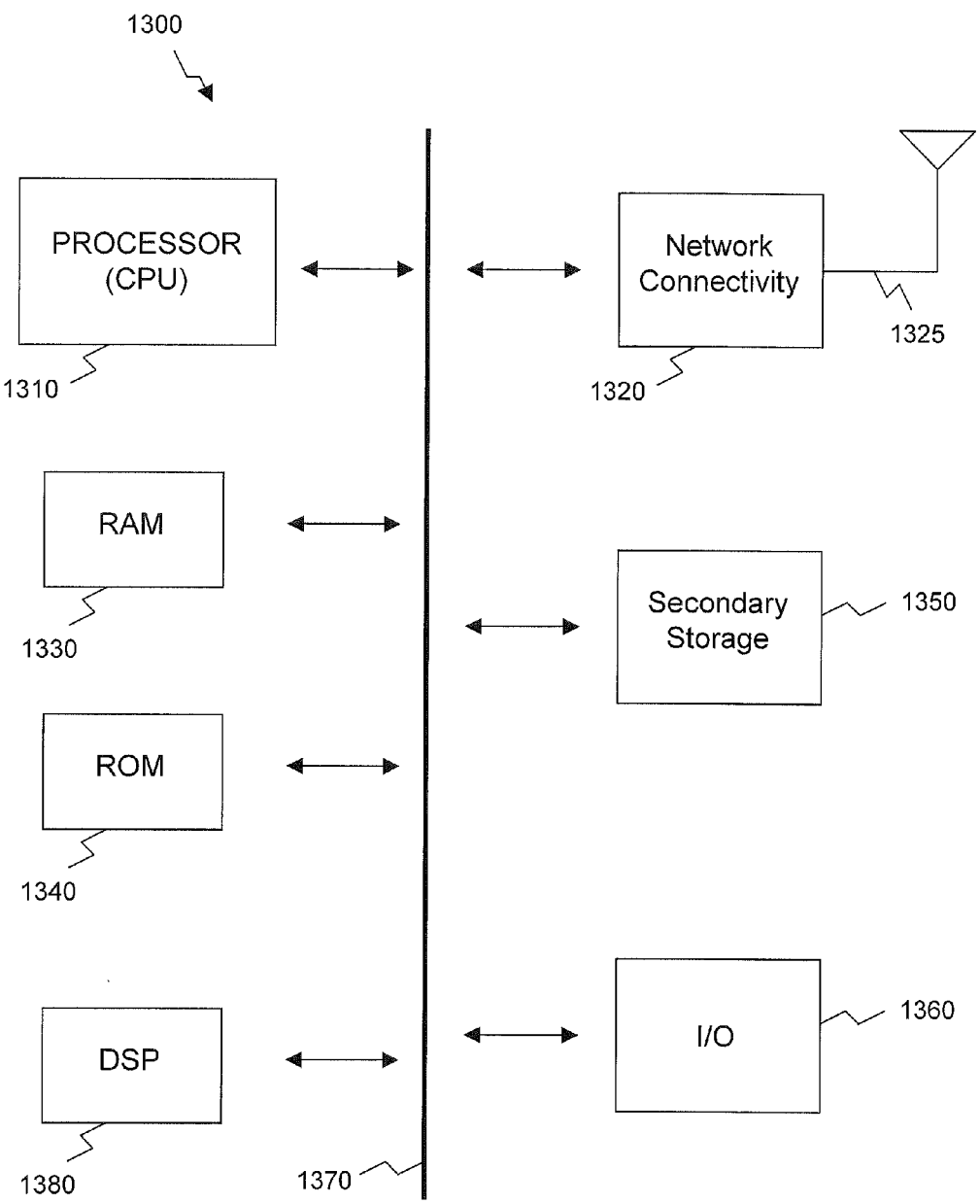
FIG. 5 illustrates a processor and related components suitable for implementing the several embodiments of the present disclosure.

The UA 110 and other components described above might include a processing component that is capable of executing instructions related to the actions described above. FIG. 5 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. These components might communicate with one another via a bus 1370. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing, such as a digital signal processor (DSP) 1380. Although the DSP 1380 is shown as a separate component, the DSP 1380 might be incorporated into the processor 1310.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one CPU 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1320 may enable the processor 1310 to communicate with the Internet or one or more telecommunications networks or other networks from which the processor 1310 might receive information or to which the processor 1310 might output information. The network connectivity devices 1320 might also include one or more transceiver components 1325 capable of transmitting and/or receiving data wirelessly.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input or output devices. Also, the transceiver 1325 might be considered to be a component of the I/O devices 1360 instead of or in addition to being a component of the network connectivity devices 1320.

In an embodiment, a method is provided for performing initial registration. The method includes receiving a server timeout message, the server timeout message including at least a field set to a value equal to a value received during a first registration. The method further includes initiating restoration procedures by performing an initial registration.

In another embodiment, a UA is provided. The UA includes one or more processors configured such that in response to receiving a server timeout message when the server timeout message includes a field set to a value equal to a value received by the UA during registration, the UA initiates restoration procedures by performing an initial registration.

The following 3rd Generation Partnership Project (3GPP) Technical Specification (TS) is incorporated herein by reference: TS 24.229.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for handling service restoration by a network node in a Session Initiation Protocol (SIP) based network, the method comprising:
    receiving a SIP request from a user equipment (UE), and responsive to receiving the SIP request, attempting to retrieve a user's profile from a home subscriber server; and
    responsive to detecting a failure to retrieve the user's profile from the home subscriber server, sending a first SIP response to the UE of the user, the first SIP response being a SIP server timeout message, the SIP server timeout message including an indication indicating support for restoration procedures, the SIP server timeout message further including at least a first field set to a value equal to a value provided in a Service-Route header field, the Service-Route header field included in a second SIP response to a SIP REGISTER request of the UE, the SIP REGISTER request sent by the UE of the user;
    wherein the value sent in the SIP server timeout message includes a Uniform Resource Identifier (URI) representative of the network node in the SIP-based network, the value being usable by the UE to compare with the value provided in the Service-Route header field.

2. The method as claimed in claim 1, wherein the URI is a SIP URI.

3. The method as claimed in claim 1, wherein the first field comprises a P-Asserted-Identify header field.

4. The method as claimed in claim 1, wherein the network node is a Serving Call Session Control Function (S-CSCF).

5. The method as claimed in claim 1, wherein the network node is a network node within a trust domain.

6. The method as claimed in claim 1, wherein the network node is a network node performing services.

7. The method as claimed in claim 1, wherein the SIP request from the user equipment (UE) comprises one of an initial request for a dialog and a request for a standalone transaction.

8. The method as claimed in claim 1, wherein the UE determines that a network node represented by the value provided in the Service-Route header field is the same as the network node represented by the URI by a comparison of the value sent in the SIP server timeout message and the value provided in the Service-Route header field resulting in a match therebetween.

9. The method as claimed in claim 1, wherein the attempt to retrieve the user profile from the home subscriber server is based upon one of: the network node does not have the user profile, or does not trust data that it has.

10. A user agent (UA) to handle service restoration by a network node in a Session Initiation Protocol (SIP) based network, the UA comprising:
    at least one storage device, and
    one or more processors configured to execute instructions stored on the at least one storage device such that when executed, cause the one or more processors to:
    receive, via at least one transceiver on the UA, a SIP request from a user equipment (UE), and responsive to receiving the SIP request, attempt to retrieve a user's profile from a home subscriber server; and
    responsive to detecting a failure to retrieve the user's profile from the home subscriber server, send, via the at least one transceiver, a first SIP response to the UE of the user, the first SIP response being a SIP server timeout message, the SIP server timeout message including an indication indicating support for restoration procedures, the SIP server timeout message further including a first field set to a value equal to a value provided in a Service-Route header field during a first registration, the Service-Route header field included in a second SIP response to a SIP REGISTER request, the SIP REGISTER request sent by the UE of the user;
    wherein the value sent in the SIP server timeout message includes a Uniform Resource Identifier (URI) representative of the network node, the value being usable by the UE to compare with the value provided in the Service-Route header field.

11. The UA as claimed in claim 10, wherein the URI is a SIP URI.

12. The UA as claimed in claim 10, wherein the first field comprises a P-Asserted-Identity header field.

13. The UA as claimed in claim 10, wherein the network node is a Serving Call Session Control Function (S-CSCF).

14. The UA as claimed in claim 10, wherein the network node is a network node within a trust domain.

15. The UA as claimed in claim 10, wherein the network node is a network node performing services.

16. The UA as claimed in claim 10, wherein the SIP request from the user equipment (UE) comprises one of an initial request for a dialog and a request for a standalone transaction.

17. The UA as claimed in claim 10, wherein the UE determines that a network node represented by the value provided in the Service-Route header field is the same as the network node represented by the URI by a comparison of the value sent in the SIP server timeout message and the value provided in the Service-Route header field resulting in a match therebetween.

18. The UA as claimed in claim 10, wherein the attempt to retrieve the user profile from the home subscriber server is based upon one of: the network node does not have the user profile, or does not trust data that it has.

* * * * *